US012728630B2

(12) United States Patent
Gitsas et al.

(10) Patent No.: US 12,728,630 B2
(45) Date of Patent: Sep. 8, 2026

(54) POLYETHYLENE SEALANT FILM WITH LOW FRICTION CONTAINING RECYCLED POLYMER

(71) Applicants: Abu Dhabi Polymers Co. Ltd. (Borouge) - Sole Proprietorship L.L.C., Abu Dhabi (AE); Borealis AG, Vienna (AT)

(72) Inventors: Antonis Gitsas, Linz (AT); Anthony Berthelier, Courbevoie (FR); Chantal Semaan, Barcelona (ES); Andrey Buryak, Linz (AT); Subrata Kumar Das, Abu Dhabi (AE); Raghvendra Singh, Abu Dhabi (AE); Mohammad Al Talafha, Abu Dhabi (AE); Fang Zhang, Shanghai (CN)

(73) Assignee: BOREALIS GMBH, Vienna (AT)

( * ) Notice: Subject to any disclaimer, the term of this patent is extended or adjusted under 35 U.S.C. 154(b) by 55 days.

(21) Appl. No.: 18/688,494

(22) PCT Filed: Sep. 2, 2021

(86) PCT No.: PCT/CN2021/116207
§ 371 (c)(1),
(2) Date: Mar. 1, 2024

(87) PCT Pub. No.: WO2023/028943
PCT Pub. Date: Mar. 9, 2023

(65) Prior Publication Data

US 2024/0359444 A1 Oct. 31, 2024

(51) Int. Cl.

| | |
|---|---|
| ***B32B 27/32*** | (2006.01) |
| ***B29C 48/00*** | (2019.01) |
| ***B29C 48/08*** | (2019.01) |
| ***B29C 48/21*** | (2019.01) |
| ***B32B 7/12*** | (2006.01) |
| ***B32B 27/08*** | (2006.01) |
| ***B32B 37/12*** | (2006.01) |
| ***B32B 38/00*** | (2006.01) |
| *B29K 23/00* | (2006.01) |
| *B29L 31/00* | (2006.01) |

(52) U.S. Cl.
CPC .......... *B32B 27/32* (2013.01); *B29C 48/0018* (2019.02); *B29C 48/022* (2019.02); *B29C 48/08* (2019.02); *B29C 48/21* (2019.02); *B32B 7/12* (2013.01); *B32B 27/08* (2013.01); *B32B 37/12* (2013.01); *B32B 38/0008* (2013.01); *B29K 2023/0625* (2013.01); *B29K 2023/0633* (2013.01); *B29K 2023/08* (2013.01); *B29K 2995/0012* (2013.01); *B29K 2995/0073* (2013.01); *B29L 2031/712* (2013.01); *B32B 2250/242* (2013.01); *B32B 2307/72* (2013.01); *B32B 2307/746* (2013.01); *B32B 2323/04* (2013.01); *B32B 2439/00* (2013.01)

(58) Field of Classification Search
None
See application file for complete search history.

(56) References Cited

U.S. PATENT DOCUMENTS

| | | | | |
|---|---|---|---|---|
| 7,722,794 | B2 | 5/2010 | Chang et al. | |
| 2018/0370201 | A1* | 12/2018 | Farkas | B65B 3/045 |
| 2020/0346440 | A1* | 11/2020 | Pey | B32B 27/08 |

FOREIGN PATENT DOCUMENTS

| | | | |
|---|---|---|---|
| EP | 2944466 | A1 | 11/2015 |
| WO | 9117886 | A1 | 11/1991 |
| WO | WO-2020/207940 | A1 * | 10/2020 |
| WO | 2020229932 | A1 | 11/2020 |

OTHER PUBLICATIONS

International Search Report of Application No. PCT/CN2021/116207, dated Feb. 9, 2022.

* cited by examiner

*Primary Examiner* — Mohammad M Ameen
(74) *Attorney, Agent, or Firm* — Lippes Mathias LLP

(57) ABSTRACT

The invention relates to a polyethylene sealant film comprising an outer layer O, a core layer C and an inner layer I, wherein the core layer C is made of a core layer composition comprising a component AC, which is a recycled low density ethylene polymer in an amount of at least 50 wt. %, based on the total weight of the core layer composition, and a slip agent; and the inner layer I is made of an inner layer composition comprising a component AI, which is a linear low density ethylene polymer having a density of from 910 to 925 kg/$m^3$ and an $MFR_2$ of from 0.5 to 2.0 g/10 min, determined according to ISO 1133. The invention further relates to a laminated polyethylene film and article comprising this polyethylene sealant film. The invention further relates to the use of the laminated polyethylene film and/or the polyethylene sealant film for packaging of an article.

18 Claims, No Drawings

POLYETHYLENE SEALANT FILM WITH LOW FRICTION CONTAINING RECYCLED POLYMER

CROSS REFERENCE TO RELATED APPLICATIONS

This is a 371 of PCT Application No. PCT/CN2021/116207, filed Sep. 2, 2021, the contents of which are incorporated herein in their entirety.

The present invention relates to a polyethylene sealant film comprising an outer layer O, a core layer C and an inner layer I, wherein the core layer C comprises a recycled low density ethylene polymer. Furthermore, the invention relates to a laminate and article comprising the film, and to the use of said laminate or film.

Laminated film structures are widely used in the packaging industry and typical 2-ply to 5-ply laminates are commonly used in various packaging applications. In the majority of these applications, polyethylene (PE) films are used as the sealant film/layer of the laminate, as polyethylene has excellent sealing performance. These polyethylene films are laminated with other substrates to provide stiffness or other desired properties like barrier performance and optical properties (gloss and transparency).

However, the challenge of disposal of accumulated waste plastics, such as those originating from packaging applications and corresponding environmental issues have received widespread attention from the public. Therefore, besides the concepts of the prevention of plastic waste in general and the prevention of leakage of plastic waste into the environment in particular, recycling of waste plastics material has become an important topic.

To satisfy the today's trend to provide recyclable materials for sustainable packaging, recyclable polyethylene laminates with the required properties are of high interest.

Moreover, the attempt of reusing plastics is of increasing interest and importance for ecological reasons and for cost reduction, why recycling of plastics becomes more important.

Thus, there is an increasing importance to include polymers obtained from waste materials for the manufacturing of new products, i.e. wherein waste plastics (e.g. post-consumer recyclate (PCR)) can be turned into resources for new plastic products. Hence, environmental and economic aspects can be combined in recycling and reusing waste plastics material.

The international application WO 2020/207940 provides collation shrink films comprising a recycled ethylene polymer in the core layer. This film is used in packaging applications, however different properties are demanded from a collation shrink film as compared to sealant films for laminate packaging articles, e.g. in terms of mechanical properties such as stiffness etc. The prepared films of WO 2020/207940 do not contain any slip or anti-block agents.

Nevertheless, the use of recycled materials is limited due to their poorer performance, in particular, recycled polymers are characterized by extreme stickiness, which negative influences the film production and performance.

It is therefore an object of the present invention to provide polyethylene films, which fulfill the general requirements on packaging applications, such as mechanical properties, heat properties, barrier properties and aesthetics, and are suitable for recycling after the intended use.

It is a further object of the present invention to provide respective polyethylene films, which already contain recycled polymers but do not suffer from the drawbacks generally connected with the recycled materials.

The combination of these objects is achieved by the present invention, which provides a polyethylene sealant film comprising an outer layer O, a core layer C and an inner layer I, wherein a) the core layer C is made of a core layer composition comprising a component AC, which is a recycled low density ethylene polymer (LDPE) in an amount of at least 50 wt. %, based on the total weight of the core layer composition, and a slip agent; and
b) the inner layer is made of an inner layer composition comprising a component AI, which is a linear low density ethylene polymer (LLDPE) having a density of 910 to 925 kg/$m^3$ and an $MFR_2$ of from 0.5 to 2.0 g/10 min, determined according to ISO 1133.

The present invention is based on the finding that such polyethylene sealant films, which can be used in packaging materials, may be provided by a film comprising a core layer and an inner (sealing) layer, wherein the core layer composition comprises a recycled low density ethylene polymer and a slip agent and the inner layer composition comprises a particularly selected ethylene polymer.

The combination of the core layer C and the inner layer I of the polyethylene sealant films according to the present invention solves the above objects.

Generally, the films according to the present invention are polyethylene-based films, which may easily be recycled. They are characterized by all the physical properties required for packaging applications.

In particular, undesired stickiness of the film, in particular of the core layer, is avoided by the presence of a slip agent in the core layer and optionally the inner layer. In this way, the recycled ethylene polymer may be contained in relatively high amounts in the core layer without suffering from drawbacks during preparation of the films. Further, the film coefficient of friction is significantly reduced. Accordingly, the films according to the present invention may be run on conventional packaging lines at normal (high) speed conditions.

In the present invention, the polyethylene sealant film comprises, or consists of, an outer layer O, a core layer C and an inner layer I, wherein the core layer C is located between the inner layer I and the outer layer O.

Core Layer C

The core layer C of the film is made of a core layer composition comprising components, which particularly contribute to stiffness of the film necessary for film extrusion and lamination processes.

Component AC

The core layer C is made of a core layer composition comprising a component AC, which is a recycled low density ethylene polymer (LDPE) in an amount of at least 50 wt. %, based on the total weight of the core layer composition, and a slip agent.

The component AC is a recycled low density ethylene polymer (LDPE).

LDPEs are generally well known in the art and are usually produced in high pressure processes usually performed in a tubular reactor or an autoclave.

In the present disclosure, the term "recycled low density ethylene polymer" refers to a recycled polymer material that comprises at least 80 wt. %, preferably at least 75 wt. %, more preferably at least 90 wt. % and most preferably at least 95 wt. % of LDPE, based on the total weight of the recycled low density ethylene polymer, which has been recycled. Accordingly, the "recycled low density ethylene polymer" may comprise up to 20 wt. %, preferably up to 15 wt. %, more preferably up to 10 wt. % and most preferably up to 5 wt. %, based on the total weight of the recycled low density ethylene polymer, of other (preferably recycled) polymer components such as for example LLDPE, MDPE and HDPE.

Recycled polymer material is a polymer material that is recovered from post-consumer waste and/or industrial waste. Post-consumer waste refers to objects having completed at least a first use cycle (or life cycle), i.e. having already served their first purpose; while industrial waste refers to the manufacturing scrap which does normally not reach a consumer.

As the opposite, the term "virgin" refers to freshly produced materials and/or objects prior to first use and not being recycled. In case that the origin of the polymer is not explicitly mentioned, the polymer is a "virgin" polymer.

In one embodiment of the present invention, the recycled LDPE of component AC originates from post-consumer waste.

Preferably, the recycled LDPE has an $MFR_2$ of from 0.1 to 10 g/10 min, more preferably from 0.2 to 5 g/10 min, still more preferably from 0.25 to 1.0 g/10 min and most preferably from 0.3 to 0.8 g/10 min, determined according to ISO 1133.

The recycled LDPE preferably has a density of from 910 to 945 kg/m$^3$, preferably from 910 to 940 kg/m$^3$, more preferably from 915 to 935 kg/m$^3$ and most preferably from 918 to 930 kg/m$^3$, determined according to ISO 1183.

The recycled LDPE preferably has a melting point (second melting) in the range of from 105 to 130° C., preferably in the range from 108 to 125° C., determined according to ISO 11357.

As the recycled LDPE of component AC, the products NAV 101 and CWT 100 LG as supplied by Ecoplast and Borealis may be used.

The component AC is present in the core layer composition in an amount of more than 50 wt. %, preferably in an amount of 50 to 95 wt. %, more preferably 55 to 90 wt. % and most preferably 60 to 85 wt. %, based on the total weight of the core layer composition.

In addition to the component AC, the core layer composition may comprise further components, which are different from the component AC.

Component BC

The core layer composition may further comprise a component BC. Preferably, the component BC is a linear low density ethylene polymer (LLDPE), more preferably, a multimodal linear low density ethylene polymer and most preferably, a multimodal ethylene terpolymer (terpolymer I).

Preferably, the component BC has a melt flow rate $MFR_5$ of from 0.5 to 5 g/10 min, more preferably from 0.6 to 4 g/10 min, determined according to ISO 1133.

Preferably, the component BC has a density of from 920 to 940 kg/m$^3$, determined according to ISO 1183, and/or an $MFR_2$ of from 0.05 to 2 g/10 min, determined according to ISO 1133.

In a preferred embodiment, the component BC is a multimodal ethylene terpolymer (terpolymer I) having an $MFR_5$ of from 0.5 to 5 g/10 min, determined according to ISO 1133, and a density of from 920 to 940 kg/m$^3$, determined according to ISO 1183.

Preferably, the terpolymer (I) comprises, or consists of, a) a low molecular weight polymer which is either a homopolymer of ethylene or a binary copolymer of ethylene and a C4 to C12 alpha-olefin and b) a high molecular weight polymer which is either a binary copolymer of ethylene and 1-butene, if the low molecular weight polymer of a) is a binary copolymer of ethylene and a C6 to C12 alpha-olefin, or a terpolymer of ethylene, 1-butene and a C6 to C12 alpha-olefin.

Such bimodal ethylene terpolymers are, for example, disclosed in WO03/066698. As far as definitions (such as for the "modality" of a polymer) and production methods for these ethylene terpolymers are concerned, it is referred to WO03/066698. Furthermore, all embodiments and preferred embodiments of such ethylene terpolymers as described in WO03/066698, which have a density in the range of from 920 to 940 kg/m$^3$, are also preferred embodiments of the ethylene terpolymer (I) of the present disclosure, whether or not explicitly described herein.

Preferably, the terpolymer (I) has a density in the range of from 928 to 940 kg/m$^3$, more preferably from 930 to 939 kg/m$^3$.

Preferably, the C4 to C12 alpha-olefin of the low molecular weight copolymer fraction is selected from the group consisting of 1-butene, 1-hexene, 4-methyl-1-pentene, 1-octene and 1-decene.

Furthermore, preferably the C6 to C12 alpha-olefin of the high molecular weight copolymer fraction is preferably selected from the group consisting of 1-hexene, 4-methyl-1-pentene, 1-octene and 1-decene.

Preferably, the terpolymer (I) comprises, or consists of, a) a low molecular weight homopolymer of ethylene and b) a high molecular weight terpolymer of ethylene, 1-butene and a C6 to C12 alpha-olefin, preferably a high molecular weight terpolymer of ethylene, 1-butene and 1-hexene.

The weight average molecular weight of the terpolymer (I) is preferably between 190,000 to 400,000 g/mol, more preferably between 200,000 to 300,000 g/mol.

The low molecular weight polymer fraction has a weight average molecular weight preferably of from 4,500 to 55,000 g/mol, more preferably of from 5,000 to 50,000 g/mol, and the high molecular weight polymer has a weight average molecular weight preferably of from 450,000 to 1,000,000 g/mol, more preferably of from 500,000 to 1,000,000 g/mol.

The terpolymer (I) preferably has a melt flow rate $MFR_2$ of from 0.05 to 2 g/10 min, more preferably from 0.1 to 1.3 g/10 min.

The terpolymer (I) preferably has a melt flow rate $MFR_5$ of from 0.6 to 4 g/10 min, more preferably from 0.7 to 3 g/10 min.

The terpolymer (I) preferably has a melt flow rate $MFR_{21}$ of from 10 to 50 g/10 min, more preferably from 15 to 45 g/10 min.

The low molecular weight polymer fraction of the terpolymer (I) preferably has a melt flow rate $MFR_2$ of from 200 to 800 g/10 min, more preferably from 300 to 600 g/10 min.

The terpolymer (I) preferably comprises from 30 to 60 wt. %, more preferably from 35 to 50 wt. % and most preferably from 38 to 45 wt. % of the low molecular weight polymer fraction, the remainder being preferably the high molecular weight polymer fraction.

The overall comonomer content in the total polymer is preferably from 1 to 7 mol %, more preferably from 2 to 6 mol %.

Preferably, in the low molecular weight polymer the comonomer content is from 0 to 2.5 mol %, more preferably from 0 to 2 mol %. In the high molecular weight polymer the comonomer content is preferably from 2.5 to 11 mol %, more preferably from 3 to 10 mol %.

In the embodiments, wherein the terpolymer (I) comprises, or consists of, a) a low molecular weight homopolymer of ethylene and b) a high molecular weight terpolymer of ethylene, 1-butene and 1-hexene, it is preferred that the content of 1-butene in the final polymer is from 1.0 to 2.0 wt. % and the content of 1-hexene is from 4.0 to 6.0 wt. %.

Preferably, the terpolymer (I) has a viscosity n measured at 0.05 rad/s of from 10,000 to 65,000 Pas, more preferably from 15,000 to 60,000 Pa·s, and most preferably from 20,000 to 55,000 Pa·s.

As the multimodal terpolymer (I) of component BC, a commercially available product BorShape™, such as BorShape™ FX1001 or BorShape™ FX1002, from Borealis may be used.

FX1001 is a bimodal LLDPE terpolymer. The low molecular weight fraction is a homopolymer of ethylene having an $MFR_2$ of 400 g/10 min, preferably produced in a loop reactor. In the high molecular weight fraction, preferably produced in a gas phase reactor, ethylene is co-polymerized with 1-butene and 1-hexene as comonomers. The density of the final resin is 931 kg/$m^3$ and the $MFR_5$ is 0.85 g/10 min. The split (LMW/HMW) is 39/61. FX1001 has an $M_w/M_n$ of about 14 (from 13 to 15). The content of 1-butene in the final polymer is 1.5 wt. % and the content of 1-hexene is 5.5 wt. %. The viscosity n, measured at 0.05 rad/s, is 52000 (+/−5000) Pa·s.

FX1002 is a bimodal MDPE terpolymer. The low molecular weight fraction is a homopolymer of ethylene having an $MFR_2$ of 400 g/10 min, preferably produced in a loop reactor. In the high molecular weight fraction, preferably produced in a gas phase reactor, ethylene is co-polymerized with 1-butene and 1-hexene as comonomers. The density of the final resin is 937 kg/$m^3$, the $MFR_5$ is 2 g/10 min and the $MFR_{21}$ is 42 g/10 min. The split (LMW/HMW) is 43/57. FX1002 has an $M_w/M_n$ of about 12 (from 11 to 13). The content of 1-butene in the final polymer is 1.5 wt. % and the content of 1-hexene is 4.5 wt. %. The viscosity n, measured at 0.05 rad/s, is 23000 (+/−3000) Pa·s.

Preferably, the component BC is present in an amount of 5 to 50 wt. %, more preferably 10 to 45 wt. % and most preferably 15 to 40 wt. %, in the core layer composition, based on the total weight of the core layer composition.

In one embodiment of the film, the core layer C is made of core layer composition comprising, or consisting of, the components AC and BC, selected from any of the embodiments as described above.

Preferably, the component AC is present in an amount of 55 to 90 wt. % and more preferably 60 to 85 wt. %, and the component BC is present in an amount of 10 to 45 wt. %, preferably 15 to 40 wt. %, in the core layer composition, based on the total weight of the core layer composition.

Additives

According to the invention, the core layer composition comprises a slip agent. As per definition, a slip agent is an additive that changes the slip properties between films and between the film and converting equipment.

Preferably, the slip agent is present in the core layer composition in an amount of from 50 to 5000 ppm, more preferably from 100 to 4000 ppm, even more preferably from 300 to 3000 ppm and most preferably from 400 to 2000 ppm, based on the total weight of the core layer composition.

Preferably, the slip agent comprises a compound selected from the group consisting of fatty acid amides, such as erucamide, oleamide or stearamide, and combinations thereof.

In one embodiment, the core layer comprises from 300 to 3000 ppm erucamide.

In one embodiment, the core layer composition comprises an anti-block agent. As per definition, an anti-block agent assists in minimizing surfaces from interacting with one another either through adhesion or other forces.

The anti-block agent may be present in the core layer composition in an amount of from 50 to 5000 ppm, preferably from 100 to 4000 ppm, more preferably from 300 to 3000 ppm, based on the total weight of the core layer composition.

Preferably, the anti-block agent comprises a compound selected from the group consisting of inorganic compounds such as talc, kaolin, cristobalite, natural silica and synthetic silica, diatomaceous earth, mica, calcium carbonate, calcium sulfate, magnesium carbonate, magnesium sulfate, and feldspars, and combinations thereof.

The slip agent and optionally anti-block agent may be added to the core layer composition during preparation of the composition or may already be contained in any of the polymers used for the preparation of the core layer.

The slip agent and optionally anti-block agent may be added as pure compounds or as (e.g. commercially available) compositions including one or more of these agents, such as Polybatch FSU-105-E or Polybatch CE505E (provided by A. Schulman).

The core layer composition may comprise further additives as described further below.

Inner Layer I

The inner layer I, which is the sealing layer of the sealant film, is an external layer of the film, and it is made of an inner layer composition comprising components, which particularly contribute to heat and sealing properties.

Component AI

The inner layer I is made of an inner layer composition comprising, or consisting of, a component AI, which is a linear low density ethylene polymer (LLDPE) having a density of from 910 to 925 kg/$m^3$, determined according to ISO 1183, and an $MFR_2$ of from 0.5 to 2.0 g/10 min, determined according to ISO 1133.

LLDPEs are well known in the art and are produced in polymerization processes using a catalyst.

In one embodiment, the LLDPE of component AI is an ethylene copolymer, preferably a multimodal ethylene copolymer, having a density of from 910 kg/$m^3$ to 925 kg/$m^3$ and an $MFR_2$ of from 0.5 to 2.0 g/10 min.

Preferably, the ethylene copolymer has a ratio $MFR_{21}/MFR_2$ of from 13 to 30 and/or an MWD of 6 or less.

Preferably, the ethylene copolymer comprises, or consists of, a multimodal polymer of ethylene with one or more comonomers selected from alpha-olefins having from 4 to 10 carbon atoms, which has a ratio $MFR_{21}/MFR_2$ of from 13 to 30 and an MWD of 6 or less.

Such multimodal ethylene copolymers are disclosed, for example, in WO2016/083208.

The multimodal ethylene copolymer preferably has an $MFR_2$ of from 0.6 to 2.0 g/10 min, and particularly preferred from 1.2 to 1.8 g/10 min.

Preferably, the multimodal ethylene copolymer has a density of from 910 to 925 kg/$m^3$, more preferably of from 913 to 922 kg/$m^3$, and particularly preferred of from 916 to 920 kg/$m^3$.

The multimodal ethylene copolymer preferably has a ratio $MFR_{21}/MFR_2$ of from 13 to 30, more preferably from 15 to 25.

The multimodal ethylene copolymer preferably has an MWD of 6 or less and usually more than 1, more preferably of from 3 to 5.

The alpha-olefin comonomers having from 4 to 10 carbon atoms of the multimodal ethylene copolymer are preferably 1-butene and/or 1-hexene.

Preferably, the total amount of comonomers present in the multimodal ethylene copolymer is from 0.5 to 10 mol %, preferably from 1 to 8 mol %, more preferably from 1 to 5 mol %, still more preferably from 1.5 to 5 mol % and most preferably from 2.5 to 4 mol %.

In a preferred embodiment, the multimodal ethylene copolymer is a bimodal copolymer, i.e. it comprises a low molecular weight and a high molecular weight component, and has an $MFR_2$ of from 1.2 to 1.8 g/10 min, and/or an $MFR_5$ of from 3.0 to 5.0 g/10 min, and/or an $MFR_{21}$ of from 20 to 40 g/10 min, and/or a density of from 916 to 920 $kg/m^3$, and/or a molecular weight distribution (MWD) of from 3 to 5, and/or an $M_n$ of from 15 to 25 kg/mol, and/or an $M_w$ of from 80 to 115 kg/mol, and/or an $MFR_{21}/MFR_2$ ratio ($FRR_{21/2}$) of from 15 to 25, and/or an $MFR_{21}/MFR_5$ ratio ($FRR_{21/5}$) of from 6 to 9.

In a further preferred embodiment, the ethylene copolymer of component AI comprises, or consists of, an ethylene terpolymer, more preferably a multimodal ethylene terpolymer (II).

Preferably, the multimodal ethylene terpolymer (II) is an ethylene terpolymer having a density of from 910 $kg/m^3$ to 925 $kg/m^3$ and an $MFR_2$ of from 0.5 to 2.0 g/10 min.

The multimodal ethylene terpolymer (II) preferably comprises, or consists of, a multimodal polymer of ethylene with at least two different comonomers selected from alpha-olefins having from 4 to 10 carbon atoms, which has a ratio $MFR_{21}/MFR_2$ of from 13 to 30 and an MWD of 5 or less.

Such multimodal ethylene terpolymers are disclosed, for example, in WO2016/083208. As far as definitions (such as for the "modality" of a polymer) and production methods for these ethylene terpolymers are concerned, it is referred to WO2016/083208. Furthermore, all embodiments and preferred embodiments of such ethylene terpolymers as described in WO2016/083208, which have a density in the range of from 910 to 925 $kg/m^3$ are also preferred embodiments of the multimodal ethylene terpolymer (II) in the present disclosure, whether or not explicitly described herein.

The multimodal ethylene terpolymer (II) preferably has an $MFR_2$ of from 0.6 to 2.0 g/10 min, and particularly preferred from 1.2 to 1.8 g/10 min.

Preferably, the multimodal ethylene terpolymer (II) has a density of from 910 to 925 $kg/m^3$, more preferably from 913 to 922 $kg/m^3$, and particularly preferred from 916 to 920 $kg/m^3$.

The multimodal ethylene terpolymer (II) preferably has a ratio $MFR_{21}/MFR_2$ of from 13 to 30, more preferably from 15 to 25.

The at least two alpha-olefin comonomers having from 4 to 10 carbon atoms of the multimodal ethylene terpolymer (II) are preferably 1-butene and 1-hexene.

Preferably, the total amount of comonomers present in the multimodal ethylene terpolymer (II) is from 0.5 to 10 mol %, more preferably from 1 to 8 mol %, even more preferably from 1 to 5 mol %, still preferably from 1.5 to 5 mol % and most preferably from 2.5 to 4 mol %.

The multimodal ethylene terpolymer (II), which preferably is a bimodal terpolymer, preferably comprises, or consists of, an ethylene polymer component (A) and an ethylene polymer component (B), wherein the ethylene polymer component (A) has higher $MFR_2$ than the ethylene polymer component (B).

Preferably, the ethylene polymer component (A) has an $MFR_2$ of from 1 to 50 g/10 min, more preferably from 1 to 40 g/10 min, even more preferably from 1 to 30 g/10 min, still more preferably from 2 to 20 g/10 min, still more preferably from 2 to 15 g/10 min and most preferably from 2 to 10 g/10 min.

The ratio of the $MFR_2$ of ethylene polymer component (A) to the $MFR_2$ of the ethylene polymer component (B) is from 2 to 50, preferably from 5 to 40, more preferably from 10 to 30, even more preferably from 10 to 25 and most preferably from 11 to 25.

Preferably, the ethylene polymer component (A) comprises a different comonomer than the ethylene polymer component (B).

Preferably, the ethylene polymer component (A) has lower amount (mol %) of comonomer than the ethylene polymer component (B), more preferably, the ratio of [the amount (mol %) of the alpha-olefin comonomer having from 4 to 10 carbon atoms comonomer present in ethylene polymer component (A)] to [the amount (mol %) of at least two alpha-olefin comonomers having from 4 to 10 carbon atoms of the final multimodal ethylene terpolymer] is of from 0.10 to 0.60, preferably from 0.15 to 0.50.

Preferably, the alpha-olefin comonomer having from 4 to 10 carbon atoms of the ethylene polymer component (A) is 1-butene and the alpha-olefin comonomer having from 4 to 10 carbon atoms of the ethylene polymer component (B) is 1-hexene.

Preferably, the ethylene polymer component (A) has different, preferably higher, density than the density of the ethylene polymer component (B).

The density of the ethylene polymer component (A) is preferably from 925 to 950 $kg/m^3$, more preferably from 930 to 945 $kg/m^3$.

Preferably, the multimodal ethylene terpolymer (II) comprises the ethylene polymer component (A) in an amount of from 30 to 70 wt. %, more preferably from 40 to 60 wt. %, even more preferably from 35 to 50 wt. %, still more preferably from 40 to 50 wt. %; and the ethylene polymer component (B) in an amount of from 70 to 30 wt. %, more preferably from 60 to 40 wt. %, even more preferably from 50 to 65 wt. %, still more preferably from 50 to 60 wt. %, based on the total amount (100 wt. %) of the multimodal ethylene terpolymer (II).

Most preferably, the multimodal ethylene terpolymer (II) consists of the ethylene polymer components (A) and (B) as the sole polymer components. Accordingly, the split between the ethylene polymer component (A) to the ethylene polymer component (B) is (30 to 70): (70 to 30) preferably (40 to 60): (60 to 40), more preferably (35 to 50): (65 to 50), still more preferably (40 to 50): (50 to 60).

In a particularly preferred embodiment, the multimodal ethylene terpolymer (II) is a bimodal terpolymer, i.e. comprises a low molecular weight and a high molecular weight component, and has an $MFR_2$ of from 1.2 to 1.8 g/10 min, and/or an $MFR_5$ of from 3.0 to 5.0 g/10 min, and/or an $MFR_{21}$ of from 20 to 40 g/10 min, and/or a density of from 916 to 920 $kg/m^3$, and/or a molecular weight distribution (MWD) of from 3.0 to 5.0, and/or an $M_n$ of from 15 to 25 kg/mol, and/or an $M_w$ of from 80 to 115 kg/mol, and/or an $MFR_{21}/MFR_2$ ratio ($FRR_{21/2}$) of from 15 to 25, and/or an $MFR_{21}/MFR_5$ ratio ($FRR_{21/5}$) of from 6 to 9.

Preferred as the multimodal ethylene terpolymers (II) are also commercially available products such as Anteo™ from Borealis or Borouge having the properties as required herein, especially Anteo™ FK1828 or Anteo™ FK1820.

Preferably, the component AI is present in an amount of from 10 to 70 wt. %, more preferably from 20 to 60 wt. % and most preferably from 30 to 50 wt. %, in the inner layer composition, based on the total weigh of the inner layer composition.

In addition to the component AI, the inner layer composition may comprise further components, which are different from the component AI.

Component BI

The inner layer composition may further comprise a component BI. Preferably, the component BI is an ethylene-based plastomer. It has been found that the presence of a plastomer in the inner (sealing) layer changes the softness of the sealing layer and enables lower sealing temperatures.

Preferably, the plastomer of component BI is a copolymer of ethylene and a C3 to C10 alpha-olefin, preferably a copolymer of ethylene and 1-butene, 1-hexene or 1-octene and most preferably a copolymer of ethylene and 1-octene. The content of the comonomer, such as 1-octene, in the plastomer may be 5.0 to 40.0 wt %, such as 15.0 to 30.0 wt %, based on the total weight of the plastomer.

Preferably, the plastomer has an $MFR_2$ of from 0.1 and 5.0 g/10 min, preferably from 0.5 and 3.0 g/10 min and most preferably from 0.5 to 2.0 g/10 min, determined according to ISO 1133.

Preferably, the plastomer has a density of from 860 to 915 $kg/m^3$, more preferably from 880 to 912 $kg/m^3$ and most preferably from 890 to 910 $kg/m^3$, determined according to ISO 1183.

Preferably, the plastomer has a molecular mass distribution $M_w/M_n$ of below 4, such as 3.8 or below, but of at least 1.5. Preferably, the molecular mass distribution $M_w/M_n$ is between 3.5 and 1.8.

As the ethylene-based plastomer of component BI, any copolymer of ethylene and propylene or ethylene and 1-butene, 1-hexene or 1-octene having the above defined properties may be used, which are commercial available, e.g. from Borealis under the tradename Queo (such as Queo 0201FX), from DOW Chemical Corp (USA) under the tradename Engage or Affinity, or from Mitsui Chemicals under the tradename Tafmer.

Alternatively, ethylene-based plastomers may be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the person skilled in the art.

Preferably, the ethylene-based plastomers are prepared by a one stage or two stage solution polymerization process, especially by high temperature solution polymerization process at temperatures higher than 100° C.

Such process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably, the solution polymerization process is a high temperature solution polymerization process, using a polymerization temperature of higher than 100° C. Preferably, the polymerization temperature is at least 110° C., more preferably at least 150° C. The polymerization temperature can be up to 250° C.

The pressure in such a solution polymerization process is preferably in a range of 10 to 100 bar, preferably 15 to 100 bar and more preferably 20 to 100 bar. The liquid hydrocarbon solvent used is preferably a C5-C12 hydrocarbon which may be unsubstituted or substituted by C1-C4 alkyl group such as pentane, methyl pentane, hexane, heptane, octane, cyclohexane, methylcyclohexane and hydrogenated naphtha. More preferably unsubstituted C6-C10 hydrocarbon solvents are used.

Plastomers of the invention are ideally formed using metallocene-type catalysts.

A known solution technology suitable for the process according to the invention is the Borceed™ technology.

Preferably, the component BI is present in an amount of from 40 to 80 wt. %, more preferably from 50 to 70 wt. %, in the inner layer composition, based on the total weight of the inner layer composition.

Additives

The inner layer composition may comprise a slip agent and/or an anti-block agent. For the compounds, contents and further features of the additives, it is referred to the respective description of additives of the core layer composition.

The embodiments concerning the additives of the core layer composition are also embodiments of the inner layer composition.

In one embodiment, the inner layer composition comprises a slip agent in an amount of from 50 to 5000 ppm and/or an anti-block agent in an amount of from 50 to 5000 ppm, each being based on the total weight of the inner layer composition.

In another embodiment, the inner layer composition comprises from 20 to 60 wt. %, preferably from 30 to 50 wt. %, of the component AI, and optionally from 40 to 80 wt. %, preferably from 50 to 70 wt. %, of the component BI; and preferably from 100 to 3000 ppm of the slip agent and from 200 to 4000 ppm of the anti-block agent, each being based on the total weight of the inner layer composition.

Outer Layer O

The outer layer O is an external layer of the film, and it comprises components, which particularly contribute to heat resistance and optical properties of the film. The outer layer O is preferably the layer used for lamination to a substrate.

The outer layer O is made of an outer layer composition, which may comprise one or more components.

Preferably, the outer layer composition is different from the inner layer composition.

Component AO

Preferably, the outer layer composition comprises a component AO. Preferably, the component AO is a linear low density ethylene polymer (LLDPE) having a density of from 910 to 925 $kg/m^3$, determined according to ISO 1183, and an $MFR_2$ of from 0.5 to 2.0 g/10 min, determined according to ISO 1133.

The component AO is preferably an LLDPE, as described for the component AI of the inner layer composition.

All embodiments described for the component AI are embodiments of the component AO. The component AO may be selected from anyone of these embodiments independently, and the selected embodiment may be the same or different for AO and AI.

Preferably, the component AO is present in an amount of 70 to 95 wt. %, more preferably 80 to 95 wt. %, in the outer layer composition, based on the total weight of the outer layer composition.

Component BO

Preferably, the outer layer composition further comprises a component BO. Preferably, the component BO is a low density ethylene polymer (LDPE).

LDPEs are well known in the art and are produced in high pressure processes usually performed in a tubular reactor or an autoclave. LDPE and their production are, for example, described in WO2017/055174, page 9, line 29, to page 12, line 6, to which it is referred.

Preferably, the LDPE has a density of from 910 to 930 $kg/m^3$ more preferably from 918 to 928 $kg/m^3$ and most preferably from 920 to 925 $kg/m^3$, determined according to ISO 1183.

Preferably, the LDPE has an $MFR_2$ of from 0.1 to 2.5 g/10 min, more preferably from 0.25 to 2.3 g/10 min, determined according to ISO 1133. In one embodiment, the LDPE has an $MFR_2$ of from 0.5 to 1 g/10 min; in another embodiment, the LDPE has an $MFR_2$ of from 1.5 to 2.5 g/10 min.

Preferably, the component BO is a low density ethylene polymer (LDPE) having a density of from 910 to 930 $kg/m^3$ and an $MFR_2$ of from 0.1 to 2.5 g/10 min, more preferably a density of from 918 to 928 $kg/m^3$ and an $MFR_2$ of from 0.25 to 2.3 g/10 min.

In one preferred embodiment, the LDPE of component BO has an $MFR_2$ of 1.6 to 2.40, and/or a density of 920 to 925 $kg/m^3$, and/or an MWD of 5.5 to 9, and/or an $M_n$ of 12 to 18 kg/mol, and/or an $M_w$ of 80 to 130 kg/mol.

In another preferred embodiment, the LDPE of component BO has an $MFR_2$ of 0.5 to 1.0, and/or a density of 920 to 925 $kg/m^3$, and/or an MWD of 5 to 8, and/or an $M_n$ of 12 to 18 kg/mol, and/or an $M_w$ of 85 to 130 kg/mol.

All molecular weight parameters of LDPE were measured by the GPC viscosity method as further described in detail below.

As the LDPE, resin FT5230 or FT5236 as produced by Borealis may be used. Alternatively, resin FT6230 or FT6236 as produced by Borealis may be used.

Preferably, component BO is present in an amount of from 5 to 20 wt. %, more preferably from 5 to 15 wt. %, in the outer layer composition, based on the total weight of the outer layer composition.

If both components AO and BO are present in the outer layer composition, the weight ratio of AO:BO is preferably from 95:5 to 80:20.

Polyethylene Sealant Film

Structure

The polyethylene sealant film according to the present invention comprises, or consists of, several layers, and at least an inner layer I, an outer layer O and a core layer C, wherein the core layer is located between the inner layer I and the outer layer O.

In one embodiment, the film consists of an inner layer I, an outer layer O and a core layer C. In another embodiment, the film comprises one or more further intermediate (or sub-skin) layers X.

In a particular embodiment, the film further comprises one or more intermediate layer(s) X between the core layer C and the inner layer I, and the core layer C and the outer layer O, for example in a five layer film structure O/X1/C/X2/I.

Preferably, the film according to the invention comprises up to five layers.

If present, the intermediate layer(s) X preferably comprise(s), or consist(s) of, a composition similar to the composition of its neighboring layer, which may thus be a composition of the core layer C or either of a composition of the neighboring inner layer I or the neighboring outer layer O.

Preferably, the polyethylene sealant film has a thickness of 40 to 80 μm, more preferably 45 to 75 μm and most preferably 50 to 70 μm.

In the polyethylene sealant film, the core layer C preferably has a thickness of 40 to 80%, more preferably 45 to 75% and most preferably 50 to 70%, of the total film thickness.

The inner layer I and/or the outer layer O preferably each has/have a thickness of 5 to 30%, preferably 10 to 30% and most preferably 15 to 25%, of the total film thickness. In a five-layer film structure O/X1/C/X2/1, the inner layer I and/or the outer layer O preferably each has/have a thickness of 5 to 20% of, more preferably of 7.5 to 15%, of the total film thickness.

The expression "polyethylene (sealant) film" denotes a film that comprises, or consists of, at least one type of ethylene polymer, which may be a homopolymer or a copolymer of ethylene. Preferably, the polyolefin film comprises at least 90 wt. %, more preferably at least 95 wt. % and most preferably at least 98 wt. % of ethylene polymer, based on the total weight of the polyethylene film. Preferably, the polyethylene film comprises from 90 to 100 wt. %, more preferably from 95 to 100 wt. % and most preferably from 98 to 100 wt. % of ethylene polymer, based on the total weight of the polyethylene film. Most preferably, the polyethylene film consists of only ethylene polymer(s). Preferably, ethylene polymer comprises, or consists of, ethylene homopolymer and/or copolymer of ethylene with propylene and/or any of alpha-olefins having from 4 to 10 carbon atoms. Preferably, the polyethylene film does not contain non-polyolefin polymers, preferably does not contain non-polyethylene polymers. Use of polyethylene films enables the provision of fully recyclable and sustainable packaging structures.

The expression "sealant film" denotes a film that comprises a sealing layer, which is a layer that promotes bonding to another film, layer or article. The sealant film has an outer layer O, a core layer C, and an inner layer I, and optionally one or more sub-skin layer(s), wherein the inner layer is the sealing layer.

Generally, polyethylene films may be provided as oriented or non-oriented films. An oriented film is a film that has been "stretched" after its production. Oriented films are typically stretched by more than 300%, in the machine direction (MD) and/or longitudinal direction (TD), preferably by 500% and more. Films stretched in machine direction are often referred to as "MDO" films. Films stretched in two directions are referred to as "bi-axially oriented polyethylene" ("BOPE") films. A non-oriented film is a blown or cast film, which is not intentionally stretched after the film production (preferably, by more than 200%) by any suitable means i.e. subsequent heating and/or using the rollers during the film production.

Preferably, the polyethylene sealant film according to the present invention is a non-oriented film.

As is understood within the meaning of this disclosure, the polyethylene sealant film and its respective layer compositions for layer preparation may also comprise additives such as stabilizers, processing aids and/or pigments. Examples of such additives are antioxidants, UV stabilizers, acid scavengers, nucleating agents, anti-block agents, slip agents etc. as well as polymer processing agents (PPA). The additives may be present in some or only in one layer of the polyethylene film, in the same or in different contents. The core layer composition and optionally the inner layer composition of the sealant comprise(s) a slip agent as defined above. They may also comprise further additives.

Generally, each of the additives may be present in an amount of 0 to 5000 ppm, based on the total weight of the respective layer composition used for the preparation of the layers of the film. The additives are generally available from several suppliers and are contained in compositions as single additive or as admixtures of two or more additives. Such compositions may generally be present in an amount of 0 to 5 wt. % in the layer composition(s), based on the weight of the respective layer composition used for the preparation of the layers of the film.

Generally, the percentage (%) is to be understood as weight percentage (wt. %) within the meaning of this disclosure, unless otherwise indicated.

Properties

The film according to the invention has an excellent coefficient of friction (CoF). The coefficient of friction is important for maintaining good packaging performance (on FFS machines), particularly for high-speed packaging.

Preferably, the film has a dynamic coefficient of friction after 7 days of up to 0.30, more preferably up to 0.20. Preferably, the film has a dynamic coefficient of friction after 7 days of from 0.05 to 0.30.

Preferably, the film has a dynamic coefficient of friction after 1 day of up to 0.30, more preferably up to 0.20. Preferably, the film has a dynamic coefficient of friction after 1 day of from 0.05 to 0.30. Preferably, the dynamic coefficient of friction does not change by more than 15% after 7 days.

The dynamic coefficient of friction (CoF) is determined according to ASTM D1894.

The film according to the invention has an improved seal initiation temperature (SIT).

Preferably, the film has a seal initiation temperature (5 N) of less than 95° C., more preferably of less than 90° C. Also preferably, the film has a seal initiation temperature (5 N) of more than 70° C., more preferably more than 75° C. The seal initiation temperature (SIT) is determined according to ASTM F 2029 and ASTM F 88, preferably at the sealing layer of the film.

Preparation

The polyethylene sealant film according to the present invention is generally prepared by a conventional process, wherein the layers of the film are co-extruded.

The different polymer components in any of the layers of the film are typically intimately mixed prior to layer formation, for example using a twin screw extruder, preferably a counter-rotating extruder or a co-rotating extruder. Then, the blends are converted into a coextruded film.

Generally, the sealant film according to the present invention can be produced by a blown film or cast film process, preferably by a blown film process.

In order to manufacture such sealant films, for example at least two polymer melt streams are simultaneously extruded (i.e. coextruded) through a multi-channel tubular, annular or circular die to form a tube which is blown-up, inflated and/or cooled with air (or a combination of gases) to form a film. The manufacture of blown film is a well-known process.

The blown (co-)extrusion can be effected at a temperature in the range 150 to 230° C., more preferably 160 to 225° C. and cooled by blowing gas (generally air) at a temperature of 10 to 40° C., more preferably 12 to 16° C. to provide a frost line height of 0.5 to 4 times, more preferably 1 to 2 times the diameter of the die.

The blow up ratio (BUR) should generally be in the range of 1.5 to 3.5, preferably 2.0 to 3.0, more preferably 2.1 to 2.8.

Laminate & Article

The invention further relates to a laminated polyethylene film comprising the polyolefin sealant film according to the present invention. The laminated polyethylene film is a polyethylene film as defined for the expression "polyethylene (sealant) film" above.

A laminated polyethylene film may be obtained by laminating the sealant film according to the present invention to another film, such as a substrate film. This may be affected in any conventional lamination device using conventional lamination methods, such as adhesive lamination, including both solvent-based and solvent-less adhesive lamination using any conventional, commercially available adhesive. Lamination may alternatively be carried out without any adhesive, as sandwich lamination with or without a melt web, which may be pressed between the substrates. Such melt web may be any conventional melt web material based on polyethylene, such as LDPE. Lamination may further be performed via extrusion coating technique. All these lamination methods are well known in the art and described in literature.

In one embodiment, the sealant film, preferably via its outer layer O, is laminated to a substrate film and, thus, the laminated polyethylene film comprises or preferably consists of the sealant film according to the present invention and a substrate film, and optionally an adhesive layer.

The expression "substrate film" denotes a film that is used to provide physical stability (such as stiffness) to another film, e.g. if laminated to this film such as a sealant film. The substrate film may be produced by a blown film or cast film process as described above for the sealant film. The substrate film may be an oriented or a non-oriented film, orientation of films being as defined above. Preferably, the substrate film is an oriented film, preferably a uniaxially oriented film, such as a machine direction-oriented (MDO) film.

Preferably, the substrate film is also a polyethylene film as defined for the expression "polyethylene (sealant) film" above. Use of laminated polyethylene films with high contents of polyethylene enables the provision of fully recyclable and sustainable packaging structures.

Preferably, the laminated polyethylene film has a thickness of 70 to 100 μm and more preferably 80 to 90 μm.

Preferably, the laminated polyethylene film has a dynamic coefficient of friction after 4 days of up to 0.30. Preferably, the film has a dynamic coefficient of friction after 4 days of from 0.05 to 0.30. The dynamic coefficient of friction (CoF) is determined according to ASTM D1894 and may be measured on outer or inner layers of the film, preferably, it is measured on the inner layers of the film.

The invention further relates to an article comprising the polyethylene sealant film according to the present invention and/or the laminated polyethylene film according to the present invention. Preferred articles are packaging articles such as pouches, like stand up pouches, sacks, bag, sachets, lamitubes etc.

Use

The invention further relates to the use of the polyethylene sealant film according to the present invention and/or the laminated polyethylene film according to the present invention for packaging of an article. Particularly, they may be used in form, fill and seal packaging technology or in the formation of pouches, such as stand up pouches, sacks, bags, sachets or lamitubes.

Any one of the embodiments of the invention described herein can be combined with one or more of these embodiments. Particularly, any embodiment described for the sealant film of the invention is applicable to the laminated film, the article and to the use of the sealant film or the laminated film.

In the following, the invention will be further illustrated by way of examples.

Measurement and Determination Methods

The following definitions of terms and measurement and determination methods apply to the above general description of the invention as well as to the below examples. Unless otherwise indicated, the measurements of film properties were performed on sealant films with a thickness of 60 μm and laminated films with a thickness of 80 to 90 μm.

a) Melt Flow Rate MFR

The melt flow rate (MFR) was determined according to ISO 1133 and was indicated in g/10 min. The higher the melt flow rate, the lower the viscosity of the polymer. The MFR is determined at 190° C. for polyethylene and at 230° C. for polypropylene, at a loading of 2.16 kg ($MFR_2$), 5.00 kg ($MFR_5$) or 21.6 kg ($MFR_{21}$).

The quantity FRR ((melt) flow rate ratio) is an indication of molecular weight distribution and denotes the ratio of flow rates at different loadings. Thus, $FRR_{21/5}$ denotes the value of $MFR_{21}/MFR_5$ and $FRR_{21/2}$ denotes the value of $MFR_{21}/MFR_2$.

b) Density

Density of the polymer was measured according to ISO 1183-1:2004 (method A) on compression molded specimen prepared according to EN ISO 1872-2 (February 2007) and is given in kg/m$^3$.

c) GPC (1) GPC Conventional Method

Unless otherwise indicated, the GPC conventional method is used for the measurement of ethylene polymers-except for LDPE.

Molecular weight averages ($M_z$, $M_w$ and $M_n$), molecular weight distribution (MWD) and its broadness, described by polydispersity index, PDI=$M_w/M_n$ (wherein $M_n$ is the number average molecular weight and $M_w$ is the weight average molecular weight) were generally determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain)) or differential refractometer ((RI) from Agilent Technologies, equipped with 3× Agilent-PLgel Olexis and 1× Agilent-PLgel Olexis Guard columns) was used. As mobile phase 1,2,4-trichlorobenzene (TCB) stabilized with 250 mg/L 2,6-Di tert-butyl-4-methyl-phenol) was used. The chromatographic system was operated at column temperature of 160° C. and detector at 160° C. and at a constant flow rate of 1 mL/min. 200 UL of sample solution was injected per analysis. Data collection was performed using either Agilent Cirrus software version 3.3 or PolymerChar GPC-IR control software.

The column set was calibrated using 19 narrow MWD polystyrene (PS) standards in the range of from 0.5 kg/mol to 11 500 kg/mol. The PS standards were dissolved at room temperature over several hours. The conversion of the polystyrene peak molecular weight to polyolefin molecular weights is accomplished by using the Mark-Houwink equation and the following Mark-Houwink constants:

$$K_{PS} = 19 \times 10^{-3} \text{ mL/g}, \alpha_{PS} = 0.655$$

$$K_{PE} = 39 \times 10^{-3} \text{ mL/g}, \alpha_{PE} = 0.725$$

A third order polynomial fit was used to fit the calibration data.

All samples were prepared in the concentration range of around 1 mg/ml and dissolved at 160° C. for 3 (three) hours for PE in fresh distilled TCB stabilized with 250 ppm Irgafos168 under continuous gentle shaking.

(2) GPC Viscosity Method

Molecular weight averages ($M_z$, $M_w$ and $M_n$), molecular weight distribution (MWD) of LDPE is measured by GPC-viscosity method using universal calibration. Molecular weight averages ($M_w$, $M_n$), Molecular weight distribution (MWD) and its broadness, described by polydispersity index, PDI=$M_w/M_n$ (wherein $M_n$ is the number average molecular weight and $M_w$ is the weight average molecular weight) were determined by Gel Permeation Chromatography (GPC) according to ISO 16014-4 2019. A PL 220 (Polymer Laboratories) GPC equipped with an IR4 infrared detector, an online four capillary bridge viscometer (PL-BV 400-HT) was used. 3× Olexis and 1× Olexis Guard columns from Polymer Laboratories as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 μL of sample solution were injected per analysis. The corresponding detector constant of the viscometer as well as the inter-detector delay volumes were determined with a narrow PS standard (MWD=1.01) with a molar mass of 132900 g/mol and an intrinsic viscosity of 0.4789 dl/g. The detector constant of the IR4 detector was determined using NIST1475a with dn/dc of 0.094 cm$^3$/g.

The column set was calibrated using universal calibration (according to ISO 16014-2:2019) with at least 15 narrow MWD polystyrene (PS) standards in the range of 0.5 kg/mol to 11600 kg/mol. The corresponded intrinsic viscosities of the PS standards were calculated from their corresponding concentration (IR4), online viscometer signals, and determined detector constants for polystyrene. For low molecular weight PS with a molar mass below 3000 g/mol the initial weight out concentration is used, due to end group effects in the IR detector.

The molecular weight of the sample ($M_2$) at each chromatographic slice using the universal calibration approach can be calculated by following correlation:

$$\log M_1 [\eta_1] = V_R = \log M_2 [\eta_2]$$

with: $M_1$ Molar mass of PS $\eta_1$ intrinsic viscosity of the PS $M_2$ Molar mass of sample $\eta_2$ intrinsic viscosity of sample $V_R$ Retention volume All data processing and calculation was performed using the Cirrus Multi-Offline SEC-Software Version 3.2 (Polymer Laboratories a Varian inc. Company).

All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking.

d) Comonomer Content

The comonomer content was determined as described in WO2019081611, pages 31 to 34.

e) Coefficient of Friction

The dynamic Coefficient of Friction (CoF) as a measure of the frictional behavior of the film was determined using a method according to ISO 8295:1995 and ASTM D1894-11. It may be measured on outer or inner layers of the film, preferably, it is measured on the inner layers of the film.

The apparatus was similar as shown in Figure 1(c) of ASTM D1894. Three samples of size 210×297 mm were cut in machine direction from the coated material and they were thermostated at 23° C. for at least 16 hours. The test was also conducted at this temperature. The sample was fastened to the table so that the machine direction of the sample coincides with the direction in which the sled moves during the test. An aluminum foil having a size of 65×140 mm was fastened to the sled. The foil was inspected to see that it was free of wrinkles. The weight of the sled (including the foil) was 200 grams±2 grams. The sled was connected to the load cell of Instron universal testing machine as shown in Figure 1(c) of ASTM D1894. The sled was then pulled with a constant speed (100 mm/min) along the table. The recording from the load cell was then collected over time. An average force that was required to keep the sled moving, i.e., the dynamic friction force Fr was then determined as described in paragraph 9.2 of ISO 8295:1995. The dynamic coefficient of friction was then calculated as described in ISO 8295:1995, i.e. $CoF=F_f/w \cdot g$, where $F_f$ is the dynamic friction force in N, w is the weight of the sled in kg and g is the gravitational constant 9.81 m/s$^2$. Three replicate runs were conducted. If any information were missing from the above-mentioned description then the information given in ISO 8295:1995 should be used for experimental conditions and ASTM D1894, Figure 1 and paragraph 5 for the apparatus.

f) Seal Initiation Temperature (SIT)

The seal initiation temperature (SIT) at 5 N force and the maximum seal force were determined according to ASTM F2029 and ASTM F88.

The method determines the sealing temperature range (sealing range) of polyethylene films, in particular blown films or cast films. The sealing temperature range is the temperature range, in which the films can be sealed according to conditions given below. The lower limit (heat sealing initiation temperature (SIT)) is the sealing temperature at which a sealing strength of 5+/−0.5 N is achieved. The upper limit (sealing end temperature (SET)) is reached, when the films stick to the sealing device. The sealing range was determined on a J&B Universal Sealing Machine Type 4000 with a 60 μm thickness film produced on a three-layer cast film co-extrusion line as described below with the following further parameters:

Conditioning time: >96 h

Sealing jaws dimension: 50×5 mm

Sealing temperature: ambient—240° C.

Sealing temperature interval: 5° C.

Sealing time: 1 sec

Delay time: 30 sec

Sealing pressure: 0.4 N/mm$^2$ (PE);

Grip separation rate: 42 mm/sec

Sealing initiation force: 5 N

Sample width: 25 mm

Specimen is sealed A to A at each sealbar temperature and seal strength (force) is determined at each step. The temperature is determined at which the seal strength reaches 5+/−0.5 N.

g) Thickness

Thickness of the films was determined according to ASTM D6988.

h) Melting Point

Data were measured with a TA Instrument Q2000 differential scanning calorimetry (DSC) on 5 to 7 mg samples. DSC was run according to ISO 11357/part 3/method C2 in a heat/cool/heat cycle with a scan rate of 10° C./min in the temperature range of −30 to +225° C. The melting temperature (Tm) was determined from the second heating step.

EXAMPLES

Sealant Films

Two comparative examples (CE1 and CE2) and two inventive examples (IE1 and IE2) have been prepared as sealant films with a thickness of 60 μm. The details of the films are summarized in Table 1, whereas the key properties of the polymers used are listed in Table 2. The external layers each make up 20% and the core layer makes up 60% of the total film thickness.

TABLE 1

Sealant film formulations (in wt. %).

| Example | Outer layer O 20% | Core layer C 60% | Inner layer I 20% |
|---|---|---|---|
| CE1 | 80% FK1828<br>20% FT6236 | 30% FX1002<br>70% NAV101 | 80% FX1001<br>20% FK1820 |
| CE2 | 80% FK1828<br>20% FT6236 | 100% NAV 101 | 80% FX1001<br>20% FK1820 |
| IE1 | 90% FK1820<br>10% FT5236 | 29% FX1002<br>70% NAV101<br>1% slip agent | 38% FK1828<br>60% 0201FX<br>1% slip agent<br>1% AB |
| IE2 | 90% FK1820<br>10% FT5236 | 29% FX1002<br>70% CWT 100 LG<br>1% slip agent | 38% FK1828<br>60% 0201FX<br>1% slip agent<br>1% AB |

AB = Amide antiblock agent Polybatch FSU-105-E;

Slip agent: 5% erucamide slip concentrate based in polyethylene, Polybatch CE505E (A. Schulman)

TABLE 2

Characteristics of the polymers used.

| Resin name | Producer | Type | MFR (g/10 min) | Density (kg/m$^3$) | Melting point (° C.) |
|---|---|---|---|---|---|
| Anteo FK1820 | Borouge | bimodal LLDPE terpolymer | 1.5 | 918 | 122 |
| Anteo FK1828 | Borouge | bimodal LLDPE terpolymer | 1.5 | 918 | 122 |
| LDPE FT5236 | Borealis/ Borouge | tubular LDPE | 0.75 | 923 | 112 |

TABLE 2-continued

| Characteristics of the polymers used. | | | | | |
|---|---|---|---|---|---|
| Resin name | Producer | Type | MFR (g/10 min) | Density (kg/m$^3$) | Melting point (° C.) |
| LDPE FT6236 | Borealis/ Borouge | tubular LDPE | 2 | 923 | 110 |
| Borshape FX1001 | Borealis | bimodal ethylene terpolymer | 0.9* | 931 | 127 |
| Borshape FX1002 | Borealis | bimodal ethylene terpolymer | 2* | 937 | 128 |

TABLE 3

| Blown film line parameters. | |
|---|---|
| Die diameters | 300 mm |
| Die gap | 1.8 mm |
| Blow up ratio (BUR) | 2.2:1 |
| Bubble cooling | internal bubble cooling (IBC) |
| Cooling air temperature | 22° C. |
| Corona treatment outside layer | 48 dyne/cm |

The temperature profiles of the blown film extruders line i.e., the temperatures used for different locations of the blown film lines were as follows in Table 4.

TABLE 4

Blown film extruders production temperatures in ° C.

| Layer | Extruder zone 1 | Extruder zone 2 | Extruder zone 3 | Extruder zone 4 | Extruder zone 5 | Extruder zone 6 | Post Extruder zone 7 | Post Extruder zone 8 |
|---|---|---|---|---|---|---|---|---|
| CE1 | | | | | | | | |
| Outer layer (O) | 190 | 190 | 190 | 190 | 190 | 200 | 200 | — |
| Core layer (C) | 40 | 200 | 200 | 200 | 200 | 210 | 210 | 210 |
| Inner layer (I) | 190 | 190 | 190 | 190 | 190 | 200 | 200 | — |
| CE2 | | | | | | | | |
| Outer layer (O) | 190 | 190 | 190 | 190 | 190 | 200 | 200 | — |
| Core layer (C) | 40 | 200 | 200 | 200 | 200 | 210 | 210 | 210 |
| Inner layer (I) | 190 | 190 | 190 | 190 | 190 | 200 | 200 | — |
| IE1 | | | | | | | | |
| Outer layer (O) | 190 | 190 | 190 | 190 | 190 | 200 | 200 | — |
| Core layer (C) | 40 | 200 | 200 | 200 | 200 | 210 | 210 | 210 |
| Inner layer (I) | 190 | 190 | 190 | 190 | 190 | 200 | 200 | — |
| IE2 | | | | | | | | |
| Outer layer (O) | 190 | 190 | 190 | 190 | 190 | 200 | 200 | — |
| Core layer (C) | 40 | 190 | 190 | 190 | 190 | 210 | 210 | 210 |
| Inner layer (I) | 200 | 200 | 200 | 200 | 200 | 210 | 210 | — |

TABLE 2-continued

| Characteristics of the polymers used. | | | | | |
|---|---|---|---|---|---|
| Resin name | Producer | Type | MFR (g/10 min) | Density (kg/m$^3$) | Melting point (° C.) |
| NAV 101 | Borealis | LDPE post-consumer recyclate | 0.5 | 920 | 122 |
| CWT 100 LG | Borealis | LDPE post-consumer recyclate | 0.6 | 925-929 | 100-140 |
| Queo 0201FX | Borealis | Ethylene-based octene-1 plastomer | 1.1 | 902 | 95 |

MFR = $MFR_2$ (190° C./2.16 kg) except for * MFR = $MFR_5$ (190° C./5 kg).

Processibility and film properties were evaluated on large scale blown film equipment. The 3-layer blown films were produced using an Alpine-make blown film line, the films having an O/C/I structure with the layers as shown in Table 1. Performance of the films was analyzed from 60-μm blown films produced at the below process operating conditions with die-gap of 1.8 mm, lower neck-height and blow up ratio of 2.2:1. The blown film line had the following properties as follows in Table 3.

The films were evaluated for their properties by measuring the coefficient of friction and the seal initiation temperature (5 N). The results are summarized in Table 5. Accordingly, all parameters were improved in the inventive examples when compared to the comparative examples.

TABLE 5

| Sealant film properties. | | | | |
|---|---|---|---|---|
| Properties | CE1 | CE2 | IE1 | IE2 |
| dynamic CoF 1 day | 0.64 | 0.79 | 0.1 | 0.11 |
| static CoF 1 day | 0.69 | 0.83 | 0.14 | 0.15 |
| dynamic CoF 7 days | 0.51 | 0.58 | 0.1 | 0.11 |
| static CoF 7 days | 0.56 | 0.62 | 0.15 | 0.16 |
| Seal initiation temperature (° C.) | 96 | 95 | 80 | 79 |

Laminates

After extrusion, the films were laminated to a 21.5 μm MDO PE films. The films were laminated at Henkel Corporation using adhesive LA7825 and hardener LA6230 (both supplied by Henkel), mixed at a 2:1 ratio. Lamination was done on a solvent-less laminator at a running speed of 150 m/min with an adhesive content of 1.8 g/m$^2$. The corona treatment intensity on the carrier web was 2.5 KW and on the secondary web 1.5 KW. Laminated films (Table 6, wherein e.g. CE1' is a laminated film comprising the CE1 sealant film etc.) with a thickness of about 80-90 μm were prepared. Properties of the laminates were evaluated and are depicted below.

TABLE 6

Laminate properties.

| Properties | CE1' | CE2' | IE1' | IE2' |
|---|---|---|---|---|
| dynamic CoF > 96 h inside-inside | 0.30 | 0.31 | 0.26 | 0.23 |
| static CoF > 96 h inside-inside | 0.34 | 0.33 | 0.28 | 0.22 |
| dynamic CoF > 96 h outside-outside | 1.18 | 1.24 | 0.10 | 0.15 |
| static CoF > 96 h outside-outside | 1.26 | 1.38 | 0.15 | 0.25 |

MDO Film Details:

During the MDO, the primary PE film from the blown-film line, the composition of which is shown in Table 7, is heated to an orientation temperature and the heating is preferably performed utilizing multiple heated rollers. The heated film is fed into a slow drawing roll with a nip roller, which has the same rolling speed as the heated rollers. The film then enters a fast drawing roll and uniaxially stretched for 5 to 7 times faster than the slow draw roll, which effectively orients the film on a continuous basis. The oriented film is annealed by holding the film at an elevated temperature for a period of time to allow for stress relaxation. Stretching was carried out using a monodirectional stretching machine manufactured by Hosokawa Alpine AG in Augsburg/Germany. The unit consists of preheating, drawing, annealing, and cooling sections, with each set at specific temperatures to optimize the performance of the unit and produce films with the desired properties. The heating was at 105° C., the stretching was done at 117° C., annealing and cooling was done at 110° C. down to 40° C. The primary film, made of LLDPE FX1002 and HDPEs MB5568 or FB5600 (all polymers can be purchased from Borealis and/or Borouge) obtained from blown film extrusion was pulled into the orientation machine, then stretched between two sets of nip rollers, where the second pair runs at higher speed than the first pair, resulting in the desired draw ration. Stretching is carried out with the respective draw ratios to reach the desired thickness of 21.5 microns.

TABLE 7

Composition of primary film (before stretching).

| | Film Layer distribution (wt %) | | | | |
|---|---|---|---|---|---|
| | 15 | 10 | 50 | 10 | 15 |
| FX1002 | — | 70 | 100 | 70 | — |
| MB5568 or FB5600 | 100 | 30 | — | 30 | 100 |

For all extruders, zone 1-5 were heated at 180° C., and the screen changer at 195° C.

Basic properties of the primary MDO-PE film:

Film thickness: 140 μm

Draw ratio: 1:6.5

Final stretched film thickness: 21.5 μm

Accordingly, the improved parameters of the films are reflected downstream to the respective inventive laminates produced with the films of the invention.

The invention claimed is:

1. A polyethylene sealant film comprising an outer layer O, a core layer C and an inner layer I, wherein a) the core layer C is made of a core layer composition comprising a component AC, which is a recycled low density ethylene polymer in an amount of at least 50 wt %, based on the total weight of the core layer composition, and a slip agent; and a component BC, which is a linear low density ethylene polymer having an $MFR_5$ of from 0.5 to 5 g/10 min, determined according to ISO 1133, and a density of from 920 to 940 kg/m$^3$; and b) the inner layer I is made of an inner layer composition comprising a component AI, which is a linear low density ethylene polymer having a density of from 910 to 925 kg/m$^3$ and an $MFR_2$ of from 0.5 to 2.0 g/10 min, determined according to ISO 1133.

2. The polyethylene sealant film according to claim 1, wherein the component AI is an ethylene copolymer having a density of from 916 to 920 kg/m$^3$ and an $MFR_2$ of from 1.2 to 1.8 g/10 min, determined according to ISO 1133.

3. The polyethylene sealant film according to claim 1, wherein the inner layer composition further comprises a component BI, which is an ethylene-based plastomer.

4. The polyethylene sealant film according to claim 1, wherein the inner layer composition comprises a slip agent in an amount of from 50 to 5000 ppm, and/or an anti-block agent in an amount of from 50 to 5000 ppm, each being based on the total weight of the inner layer composition.

5. The polyethylene sealant film according to claim 1, wherein the slip agent comprises a compound selected from the group consisting of fatty acid amides, such as erucamide, oleamide or stearamide, and combinations thereof; and/or the anti-block agent comprises a compound selected from the group consisting of inorganic compounds such as talc, kaolin, cristobalite, natural silica and synthetic silica, diatomaceous earth, mica, calcium carbonate, calcium sulfate, magnesium carbonate, magnesium sulfate, and feldspars, and combinations thereof.

6. The polyethylene sealant film according to claim 1, wherein the component AC has an $MFR_2$ of from 0.25 to 1.0 g/10 min, determined according to ISO 1133, and/or a density of from 910 to 940 kg/m$^3$.

7. The polyethylene sealant film according to claim 1, wherein the core layer composition comprises from 50 to 5000 ppm of the slip agent, based on the total weight of the core layer composition.

8. The polyethylene sealant film according to claim 1, wherein the inner layer composition comprises from 20 to 60 wt % of the component AI, and optionally from 40 to 80 wt % of the component BI, each being based on the total weight of the inner layer composition.

9. The polyethylene sealant film according to claim 1, wherein the outer layer O is made of an outer layer composition, which is different from the inner layer composition.

10. The polyethylene sealant film according to claim 1, wherein the polyethylene sealant film has a dynamic coefficient of friction after 7 days of up to 0.30, determined according to ASTM D1894, and/or a seal initiation temperature (5 N) of less than 90° C., determined according to ASTM F 2029; ASTM F 88.

11. A laminated polyethylene film comprising the polyethylene sealant film according to claim 1 and a substrate film.

12. The laminated polyethylene film according to claim 11, wherein the laminated polyethylene film has a dynamic coefficient of friction after 4 days of up to 0.30, determined according to ASTM D1894.

13. An article comprising the polyethylene sealant film according to claim 1.

14. The polyethylene sealant film according to claim 2, wherein the component AI is a multimodal ethylene terpolymer having a density of from 916 to 920 $kg/m^3$ and an $MFR_2$ of from 1.2 to 1.8 g/10 min, determined according to ISO 1133.

15. The polyethylene sealant film according to claim 3, wherein the component BI is a copolymer of ethylene and a C3 to C10 alpha-olefin having an $MFR_2$ of from 0.5 to 2.0 g/10 min, determined according to ISO 1133, and/or a density of from 880 to 912 $kg/m^3$.

16. The polyethylene sealant film according to claim 1, wherein the component BC is a multimodal ethylene terpolymer.

17. The polyethylene sealant film according to claim 1, wherein the component BC is present in an amount of from 10 to 50 wt %, based on the total weight of the core layer composition.

18. The polyethylene sealant film according to claim 8, wherein the inner layer composition further comprises from 100 to 3000 ppm of the slip agent and from 200 to 4000 ppm of the anti-block agent, each being based on the total weight of the inner layer composition.

* * * * *